United States Patent Office 3,194,811
Patented July 13, 1965

3,194,811
AROYL-BENZINDOLYL ACIDS
Tsung-Ying Shen, Westfield, N.J., assignor to Merck & Co., Inc., Rahway, N.J., a corporation of New Jersey
No Drawing. Filed Sept. 5, 1963, Ser. No. 306,712
9 Claims. (Cl. 260—319)

This invention relates to new chemical compounds. More particularly, it relates to a new class of compounds of the benz-indole series. Still more particularly, it is concerned with new 1,3,4,5-tetrahydrobenz-[c,d]-indole-3-carboxylic acids and 1,3,4,5-tetrahydro-5-oxobenz-[c,d]-indole-3-carboxylic acids having an aromatic carboxylic acyl (i.e., an aroyl or hetero-aroyl) radical of less than three fused rings attached to the nitrogen atom of the indole ring. It is concerned further with salts, esters and amide derivatives of such compounds. It relates also to the synthesis of such substances.

The new aroyl and hetero-aroyl 1,3,4,5-tetrahydrobenz-[c,d]-indole-3-carboxylic acid and 1,3,4,5-tetrahydro-5-oxobenz-[c,d]-indole-3-carboxylic acid compounds of this invention have the general structural formula:

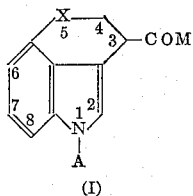

(I)

in which X is methylene or carbonyl, A is an aromatic carboxylic acyl radical, i.e., an aroyl or hetero-aroyl radical of less than three fused rings, and M is a group which provides an acid, ester, amide, anhydride or salt of the benz-indole.

In its more narrow aspects, the present invention embraces 1,3,4,5-tetrahydrobenz-[c,d]-indole - 3 - carboxylic acids and derivatives thereof having the structural formulas:

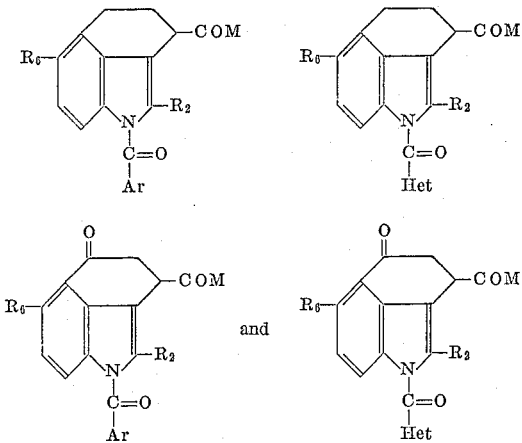

and wherein:
Ar is an aryl or substituted aryl ring having less than three fused rings; such as benzene, naphthalene, biphenyl, or a substituted benzene, napthalene or biphenyl;
Het is an aromatic heterocyclic ring having less than three fused rings, such as a five- or six-membered heteroaromatic ring, for example, furyl, thienyl, pyrrolyl, thiazolyl, thiadiazoyl, pyrazinyl, pyridyl, alkylpyridyl, pyrazolyl, imidazoyl, oxazoyl, pyrimidinyl and isoxazoyl rings; and benz derivatives thereof;
$R_2$ is hydrogen or a hydrocarbon radical having less than nine carbon atoms, such as alkyl, for example, methyl, ethyl, propyl, isopropyl, butyl, and isobutyl; aryl and substituted aryl, such as phenyl, alkoxyphenyl, for example, p-methoxyphenyl, p-ethoxyphenyl, m-butoxyphenyl, o-propoxyphenyl, 2,4-dimethoxyphenyl, 3,4-dimethoxyphenyl and 3,4,5-trimethoxyphenyl and, for example, p-chlorophenyl, p-bromophenyl, p-fluorophenyl, 3,4-dichlorophenyl and 2,3,4-trichlorophenyl; aralkyl, such as benzyl, p-methoxybenzyl, halobenzyl, and the like; and
M is a hydroxyl; amino, substituted amino, such as alkylamino, such as methylamino, ethylamino and butylamino; dialkylamino, such as dimethylamino and diethylamino; allylamino, phenethylamino, N-ethylphenethylamino, benzylamino, aniline, p-chloroaniline, p-methoxyaniline; hydroxylated amino, such as diethanolamino; ring amino, such as piperidino, pyrrolidino, morpholino, 1-methylpiperazino, N-phenylpiperazino, 1-β-hydroxyethyl piperazino, 1-methyl-2-aminomethyl pyrrolidino, 1-ethyl-2-aminomethyl piperidino, tetrahydrofurfurylamino, N-phenylpiperazino, 1,2,5,6-tetrahydropyridino; n - carbobenzyloxymethylamino, and N,N-dimethylcarboxamidomethyl; alkoxy, alkoxyalkoxy, aroxy, aralkoxy, alkaroxy, cycloalkoxy and alkeneoxy, including methoxy, ethoxy, n-butoxy, t-butoxy, ethoxyethoxy, phenoxy, benzyloxy, diphenylmethoxy, triphenylmethoxy, cyclopropoxy, beta-diethylamino, beta-dimethylaminoethoxy, phenethoxy, allyloxy, isopropoxy, N-beta-hydroxyethylmorpholine, cyclopropylmethoxy, and tetrahydrofurfuryloxy; and O Y where Y is a cation, or

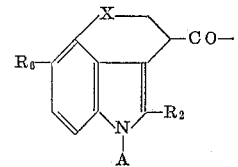

In the most preferred compounds of the invention $R_6$ is a lower alkyl, lower alkoxy, lower alkenyloxy, halogen, nitro, amino, or substituted amino. Examples of the alkyl and alkoxys are methyl, ethyl, propyl, t-butyl, methoxy, ethoxy, allyloxy, i-propoxy and the like. $R_6$ is not limited to this class of substituents, however, and may, if desired, represent hydrogen or substituents such as aryl, aralkoxy, such as benzyloxy, hydroxy, mercapto, haloalkyl, such as $CF_3$, $CHF_2$ or other haloalkyls, nitro, amino, alkylamino, acylamino, haloalkyl, cyano, sulfamyl, sulfoxide, aminomethyl, substituted amino methyl, carboxy, N,N-dialkylcarbamyl and carboalkoxy groups.

A critical feature of the new compounds described herein is the presence of an aroyl or hetero-aroyl radical attached to the N—1 position of the indole. These acyl groups may be further substituted in the aromatic ring with hydrocarbon groups or with functional substituents. The aromatic rings of such groups may contain, and in the preferred compounds do contain, at least one functional substituent. This substituent may be a hydroxy or an etherified hydroxy (hydrocarbonoxy) group such as a lower alkoxy, e.g., methoxy, ethoxy, isopropoxy, allyloxy, propoxy, an aryloxy or aralkoxy group, e.g., phenoxy, benzyloxy, halobenzyloxy, lower alkoxybenzyloxy and the like. It may be a nitro radical, a halogen such as chlorine, bromine, iodine or fluorine, an amino group or a substituted amino group, representative examples of which that might be mentioned are acylamino, amine oxide, urethanes, lower alkylamino, lower dialkylamino, amidine, acylated amidines, alkoxyamines and sulfonated amines. Further, it may be a mercapto or a substituted mercapto radical of the exemplified by alkylthio groups and their sulfoxides such as methylthio, ethylthio, propylthio and their sulfoxides and arylthio or aralkylthio groups, e.g. benzylthio and phenylthio. The N—1 aroyl radical may, if desired, be haloalkylated, as with a trifluromethyl, trifluoroethyl, perfluoroethyl, β-chloroethyl or like substituent, acylated as with acetyl, propionyl, benzoyl, phenylacetyl, trifluoroacetyl and like acyl groups, or it may contain a haloalkoxy or haloalkylthio substituent. In addition, the invention embraces compounds wherein the aroyl radical contains a sulfamyl, benzylthiomethyl, cyano, sulfonamido or dialkylsulfonamido radical. Further, it may contain a carboxy substituent, or a derivative thereof, such as an alkali metal salt or a lower alkyl ester of the carboxy radical, an aldehyde, amide, and the like, or an aldehyde derivative of the type represented by acetals or thioacetals. In the preferred compounds, the N—1 aroyl radical is benzoyl and the functional substituent is in the para position of the six-membered ring.

The 1,3,4,5 - tetrahydrobenz-[c,d]-indole-3-carboxylic acids and 1,3,4,5-tetrahydro-5-oxobenz-[c,d]-indole-3-carboxylic acids described herein are the primary objects of the present invention. Esters, salts, amides and anhydrides of such carboxylic acids represent an additional aspect of the invention. The esters are important intermediates in the synthesis of the free acids, and in many cases are, themselves, of importance as end products. Among the preferred esters are the lower alkyl esters such as the methyl, ethyl, propyl or t-butyl compounds and the benzyl and like esters.

The salts of these new 1-aroyl or 1-hetero-aroyl 1,3,4,5-tetrahydrobenz-[c,d]-indole-3-carboxylic acids and the corresponding 5-oxo compounds can be obtained by treatment of the free acid with base under mild conditions. In this manner there may be obtained alkaline metal salts such as the sodium and potassium, the aluminum or magnesium salts or salts of alkaline earth metals, examples of which are barium and calcium. Salts of organic amines such as dimethylamine, morpholine, methyl cyclohexylamine or glucosamine may be obtained by reacting the acid with the appropriate organic base. The amides included within this invention are conveniently synthesized by first preparing the amide of an 1,3,4,5-tetrahydrobenz-[c,d]-indole-3-carboxylic acid unsubstituted at the 1-position and then acylating said compound by the process described hereinbelow. Such amides are conveniently obtained by reacting the free acid with urea or treating the appropriate acid chloride with ammonia or an alkylamide (to form an N-alkylamide).

The 2-position of the benz-[c,d]-indole ring nucleus ($R_2$ in Formula 1 above) may be hydrogen although it is preferred that there be present at this position of the molecule a hydrocarbon radical having less than nine carbon atoms. Lower alkyl groups such as methyl, ethyl, propyl or butyl are the most satisfactory but aryl and substituted aryl may be used as well.

The following compounds are representative of those contemplated by this invention and which may be prepared by the procedure discussed herein below:

Methyl - 1 - p-chlorobenzoyl-2-methyl-6-methoxy-1,3, 4,5-tetrahydro-5-oxo benz-[c,d]-indole-3-carboxylate; 1-p-chlorobenzoyl - 2-methyl-6-methoxy-1,3,4,5-tetrahydro-5-oxo benz-[c,d]-indole-3- carboxylic acid; 1-p-chlorobenzoyl - 2 - methyl-6-methoxy-1,3,4,5-tetrahydrobenz-[c,d]-indole-3-carboxylic acid; 1-p-methylthiobenzoyl-2-methyl-6 - methoxy-1,3,4,5-tetrahydrobenz-[c,d]-indole-3-carboxylic acid; 1 - p - methylthiobenzoyl-2-methyl-6-methoxy-1, 3,4,5-tetrahydrobenz-[c,d]-indole-3-carboxylic acid; 1-p-methylthiobenzoyl - 2-methyl-6-methoxy-1,3,4,5-tetrahydrobenz-[c,d]-indole-3-carboxylic acid; 1-benzoyl-2-methyl - 6-methoxy-1,3,4,5-tetrahydrobenz-[c,d]-indole-3-carboxylic acids; 1-benzoyl-2-methyl-6-methoxy-1,3,4,5-tetrahydro-5-oxo benz-[c,d]-indole-3-carboxylic acid; 1,4'-thiazolyl - 2-methyl-6-methoxy-1,3,4,5-tetrahydrobenz-[c,d]-indole-3-carboxamide; 1-2'-phenoyl-2,6-dimethyl-1,3,4,5-tetrahydrobenz-[c,d]-indole-3-carboxylic acid; 1,2'-furoyl-2,6-dimethyl-1,3,4,5-tetrahydro-5-oxo benz-[c,d]-indole-3-carboxylic acid and the like.

The 1-aroyl or 1-hetero-aroyl 1,3,4,5-tetrahydrobenz-[c,d]-3-indole-3-carboxylic acids and the corresponding 5-oxo compounds and derivatives thereof described herein are synthesized from an indole having the desired substituents at the 2- and 5-positions of the indole ring nucleus, having the formula:

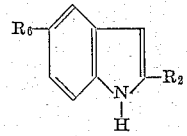

where $R_2$ and $R_6$ are as defined above. The starting indole compounds may be prepared as described in numerous places in the literature as, for example, in U.S. Patent Nos. 2,825,734 and 2,708,197.

FLOW SHEET FOR SYNTHESIS OF 1-AROYL AND 1 - HETERO - AROYL-1,3,4,5-TETRAHYDROBENZ-[C,D]-INDOLE-3-CARBOXYLIC ACIDS

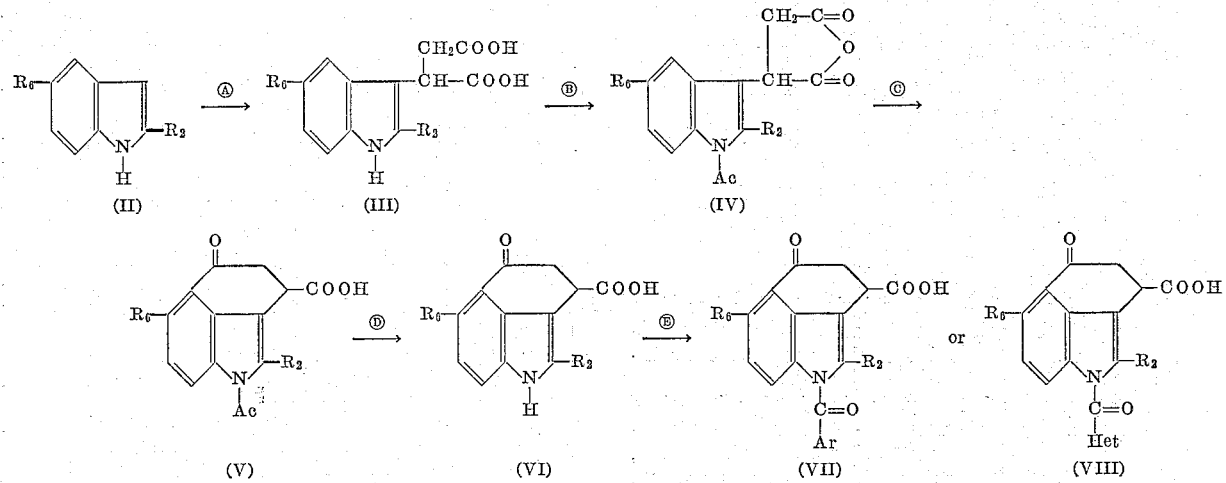

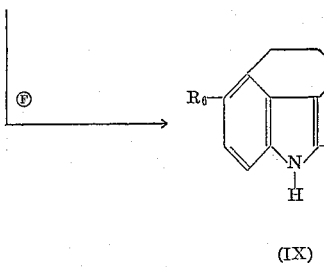
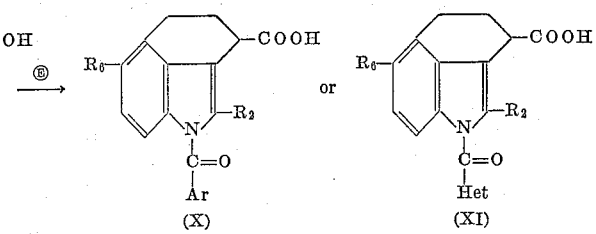

(IX)      (X)      (XI)

Generally the indoles are prepared by condensing a substituted phenyl hydrazine with an aliphatic carbonyl compound to produce the corresponding phenyl hydrazone which is cyclized to form the desired indole. Other processes are presented in the aforementioned patents. For example, 2-methyl-5-trifluoromethylindole may be prepared as follows:

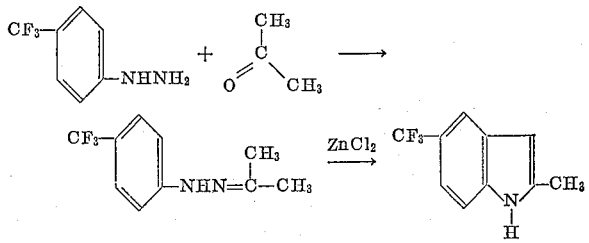

The treatment of the starting material according the process of the present invention is summarized in the flow sheet below.

The first step in the process of the present invention (step A) is the condensation of the starting indole with maleic anhydride or maleic acid according to the procedure described by Diels and Alder in Ann., 490, 277 (1931). The reaction is carried out by mixing the constituents, suitably in the absence of a solvent, with water bath heating until the mixture begins to solidify. The mixture is then made basic and heated again with agitation, cooled and the product extracted with ether. In a typical run, 2-methyl-3-indolesuccinic acid (III $R_2=CH_3$, $R_6=H$) is prepared by reaction of 2-methyl indole (II $R_2=CH_3$, $R_6=H$) and maleic acid.

The next step in the procedure of preparing the compounds of the present invention is the dehydration of the indolyl succinic acid (III) to the corresponding anhydride (IV), (step B). Suitably this step is carried out by reaction of the acid with an isopropenyl lower alkanoate, as for example, isopropenyl acetate, isopropenyl formate, isopropenyl propionate or isopropenyl butylate, in the presence of an acid catalyst. During this reaction, the nitrogen atom of the indole ring is simultaneously acylated to produce the N-lower aliphatic acyl derivative. For example, 1-acetyl-2-methyl-3-indolesuccinic anhydride is prepared by reaction of 2-methyl-3-indolesuccinic acid with isopropenyl acetate in the presence of p-toluene sulfonic acid. The reaction is advantageously carried out in an inert solvent which can be constituted by an excess of the isopropenyl acetate. Other acid catalysts which may be used include methane sulfonic acid, sulfuric acid and acid ion exchange resins. The acetone by-product formed during the reaction is removed by distillation and the desired product is recovered from the solution in any convenient manner, as for example, by crystallization from a suitable solvent.

The next step in the procedure is the cyclization of the 3-indolesuccinic acid anhydride substituted in the 1-position with the acetyl group (IV), (step C). The cyclization proceeds well in the presence of a Lewis acid, such as $AlCl_3$, $ZnCl_2$, $BF_3$, $SnCl_4$ and the like, in a Friedel-Crafts solvent, for example, ethylene dichloride, sym-tetrachloroethane, nitrobenzene or carbon disulfide. The reaction is carried out at ambient temperature with or without cooling, as desired. The quantity of each reactant can vary by a large amount without affecting the course of the reaction. Ordinarily about 2–5 moles of the condensation agent is used for each mole of anhydride. The reaction mixture is cooled and treated with a strong acid as, for example, sulfuric acid, phosphoric acid, or concentrated hydrochloric acid to precipitate the product which then is recovered from the reaction mixture by crystallization.

The cyclization step produces a 5-oxo derivative of a 1,3,4,5-tetrahydrobenz-[c,d]-indole - 3 - carboxylic acid (V). In a typical reaction, 1-acetyl-2-methyl-3-indolesuccinic anhydride is cyclized to produce 1-acetyl-1,3,4,5-tetrahydro-5-oxobenz-[c,d]-indole-3-carboxylic acid.

At this point in the procedure the acetyl group may be hydrolyzed to produce the corresponding compound unsubstituted at the nitrogen atom of the indole ring (VI) (step D). Hydrolysis can proceed in a manner which is known in the art, as for example, basic or acid hydrolysis as, for example, in potassium hydroxide or hydrochloric acid solution to produce the compound VI. For example, in this step 1-acetyl-2-methyl-1,3,4,5-tetrahydro - 5 - oxobenz-[c,d]-indole-3-carboxylic acid is hydrolyzed to produce 2-methyl-1,3,4,5-tetrahydro-5-oxobenz-[c,d]-indole-3-carboxylic acid.

Once the 5-oxo intermediate is obtained in this manner, it can be directly aroylated or heteroaroylated to produce the desired 1-aroyl 5-oxo (VII) or 1-hetero-aroyl-5-oxo (VIII) final products. This reaction can be carried out upon the acid or upon the ester or amide derivative which has the desired substituents in the 2- and 6-positions of ring nucleus. It is preferred to carry out the aroylation or hetero-aroylation on an ester or amide derivative of the carboxylic acid. In those cases where the free acid is desired, the ester may then be converted to suitable conditions to the free acid. It has been observed that the 1-aroyl or 1-hetero-aroyl substituent is easily hydrolyzed under conditions normally employed for saponification of an ester to the free acid. For this reason, care must be taken in converting the 1-aroyl or 1-heteroaroyl derivative of 1,3,4,5-tetrahydro-5-oxobenz-[c,d]-indole-3-carboxylic acid esters to the corresponding free acids. It has been found that one convenient method of accomplishing this conversion comprises acylation of the benzyl ester and subsequent hydrogenolytic removal of the benzyl ester. Alternatively, the esters, such as the t-butyl esters, which are amenable to selective removal by other treatment, such as heating above 200° C. or by heating at 25–110° C. in the presence of a catalytic amount of an aryl sulfonic acid or other acids may be utilized. When, instead of an ester, the amides of these acids are prepared, the free acids are formed by reaction of the amides with a stoichiometric quantity of nitrous acid in an inert solvent. The aroylation reaction is preferably conducted by treatment of the benz-[c,d]-indole-3-carboxylic acid material with an alkali metal hydride, such as sodium hydride, to form, e.g., a sodium salt and then intimately contacting said salt with an aroyl or heteroaroyl acid halide in an anhydrous solvent medium. It is preferred to employ solvents such as dimethylformamide, 1,2-dimethoxyethane tetrahydrofuran, dimethylformamide benzene, benzene, toluene or xylene. It is preferred also to carry out the acylation at about room temperature although lower temperatures may be employed if the particular reactants are unduly susceptible to decomposition.

An alternative method of aroylation or heteroaroylation of the 1-position is by use of a phenolic ester of the acylating acid, such as the p-nitrophenyl ester. This latter is prepared by mixing the acid and p-nitrophenol in tetrahydrofuran and adding dicyclohexyl carbodimide in tetrahydrofuran slowly. The dicyclohexylurea which forms is removed by filtration and the nitrophenyl ester is recovered from the filtrate. Alternatively there can also be used the anhydride, azide or thiophenolic ester or the aroylating acid. Whichever is used, aroylation or heteroaroylation of the benz-[c,d]-3-carboxylic acid material is achieved by forming a sodium salt of said material with sodium hydride in an anhydrous solvent and adding the nitrophenyl ester.

As described, the aroylation or hetero-aroylation step E produces the corresponding 1-aroyl or 1-heteroaroyl derivatives of 1,3,4,5-tetrahydro-5-oxobenz-[c,d]-indole-3-carboxylic acid. Compounds without the 5-oxo group can be prepared from V by simultaneous reduction of the 1-acetyl and 5-keto groups by the Huang-Minlon procedure (step F) followed by aroylation or hetero-aroylation as before (step E). Accordingly, the oxo acid is converted to a salt thereof and then reduced with hydrazine hydrate. The reduction is advantageously carried out in an inert solvent, for example, dimethylsulfoxide, diethyl glycol or triethyl glycol, at elevated temperatures. The desired 1,3,4,5-tetrahydrobenz-[c,d]-indole-3-carboxylic acids X and X1 then are obtained by acidification of the reaction mixture followed by extraction and crystallization. For example, 2-methyl-1,3,4,5-tetrahydro-5-oxobenz-[c,d]indole-3-carboxylic acid is reduced to form 2-methyl-1,3,4,5-tetrahydrobenz-[c,d]-indole-3-carboxylic acid which is then aroylated or heteroaroylated to produce the desired 1-aroyl or 1-hetero-aroyl derivative of 2-methyl-1,3,4,5-tetrahydrobenz-[c,d]-indole-3-carboxylic acid.

An alternative procedure for preparing the succinic acid intermediates (III) starts with the 3-indole carboxaldehydes which are prepared by reaction of an indole unsubstituted in the 3-position with dimethyl formamide in the presence of phosphorous oxychloride. The process involves condensation of the 3-indole carboxaldehydes with ethyl cyanoacetate or diethyl malonate, followed by reaction with potassium cyanide in ethanol to produce a cyano derivative which is hydrolyzed with aqueous potassium hydroxide to produce III.

The 1-aroyl or 1-hetero-aroyl-1,3,4,5-tetrahydrobenz-[c,d]-indole-3-carboxylic acid and the corresponding 5-oxo compounds have a high degree of anti-inflammatory activity and are effective in the prevention and inhibition of granuloma tissue formation. Certain of them possess this activity in high degree and are of value in the treatment of arthritic and dermatological disorders and in like conditions which are responsive to treatment with anti-inflammatory agents. In addition, the compounds of this invention have a useful degree of antipyretic and analgesic activity. For these purposes, they are normally administered orally in tablets or capsules, the optimum dosage depending, of course, on the particular compound being used and the type and severity of infection being treated. Although the optimum quantities of these compounds of this invention to be used in such manner will depend on the compound employed and the particular type of disease condition treated, oral dose levels of preferred compounds in the range of 1.0–2000 mg. per day are useful in control of arthritic conditions, depending on the activity of the specific compound and the reaction sensitivity of the patient.

The synthesis of various compounds of this invention having on the benz-indole ring system a 6-substituent which has a nitrogen attached to the aromatic homocyclic ring of the benz-indole is generally based on the 6-nitro compound. This is transformed into the desired 6-substituent. Such transformation may be made before or after aroylation or hetero-aroylation of the 1-position, depending on the extent to which the desired 6-substituent may interfere with the acylation. If such interference is possible, the 1-acylation should be carried out on the 6-nitro benz-indole and the nitro later transformed into the desired 6-substituent. Such transformation can be carried out in a number of ways. Suitably nitration can be effected on an n,n-dialkyl substituted amide of the benz-indole followed by acylation. Reduction of the 6-nitro groups gives a 6-amino group. Reaction of the amino with alkyl halides give mono and dialkyl amino groups. If the alkyl halide is a dihaloalkylene group (e.g., 1,4-dibromobutane) a heterocyclic ring (e.g., pyrrolidino) is formed. Similarly, bis($\beta$-chlorethyl)ether will give an N-morpholino compound. Alkylation can also be carried out simultaneous with reduction, as, e.g., with formaldehyde and Raney nickel and hydrogen. Acylation can similarly be carried out on the 6-amino compounds or on the 6-nitro (with simultaneous reduction) to give 6-acyl-amido compounds. The 6-amino group can be reacted with isocyanates to give 6-ureido compounds.

Compounds where $R_6$ is OH is prepared by starting with an indole where $R_6$ is benzyloxy and reducing the final compound substituted with a benzyloxy group to produce the corresponding hydroxy substituted compound according to the procedure in the aforementioned U.S. Patent 2,825,734.

As mentioned, $R_6$ is preferably hydrogen, allyloxy, fluoro, methyl, trifluoromethyl, benzyloxy, methoxy or dimethyl sulfamyl. All of the above $R_6$ groups do not contain an active hydrogen and therefore do not interfere with the aroylation or hetero-aroylation step. When nitro (from which amino, dimethyl amino and acyl amino is obtained) is desired in position 6 of the ring, it is preferable that the cyclization be carried out in the absence of a nitro group on position 6. Then the cyclized compound is nitrated to produce the corresponding compound where $R_6$ is nitro.

Where the aroylation or hetero-aroylation ester or amide itself is desired as a final compound, the acid VI or IX may be directly converted to the desired ester in a variety of reaction sequences, as for example, by formation of the acyl chloride and reaction with alcohol or direct reaction with alcohol, or with diazomethane or a substituted diazomethane, or in other ways known in the art as for example, with the carbodimide described above, and this ester aroylated or hetero-aroylated in the manner described above. This technique is particularly advantageous for those esters and amides which do not contain an active hydrogen as, for example, the methyl ester, the diethyl amino ethyl ester, and the morpholinyl amide. On the other hand, aroylation or hetero-aroylation of esters and amides which contain an active hydrogen in the ester or amide moiety, as, for example, the carboxamide or the hydroxy ethyl carboxamide, is carried out on, for example, on the tertiary butyl ester which is then pyrolyzed to form the acid. Esterification or amidation then can be performed on the aroylated or hetero-aroylated acid.

The following examples are given for purposes of illustration and not by way of limitation:

*Example 1.—Preparation of 1-p-chlorobenzoyl-2-methyl-1,3,4,5-tetrahydrobenz-[c,d]-indole-3-carboxylic acid*

A. *2-methyl-3-indolesuccinic acid.*—A mixture of 0.1 mole of 2-methylindole and 0.1 mole of maleic acid is heated on a steam bath until the bottom of the mixture begins to solidify. The flask then is removed from the bath and allowed to stand for 30 minutes. A solution of 11.3 grams of potassium hydroxide in 200 ml. of water is added and the mixture is heated on a steam bath with agitation for one-half hour. After cooling, the solution is extracted with ether to remove any neutral material, treated with charcoal, filtered, cooled, and acidified with hydrochloric acid. The precipitate is collected on a filter and washed with cold water to give 2-methyl-3-indolesuccinic acid; M.P. 210–211° C. (decomposition).

B. *1-acetyl-2-methyl-3-indolesuccinic anhydride.* — A mixture of 0.1 mole of 2-methyl-3-indolesuccinic acid, 200 ml. of isopropenyl acetate and 2 grams of p-toluenesulfonic acid monohydrate is heated under reflux for one-half hour. The acetone is then removed by fractionation slowly through a Vigreux column until the boiling point reaches 95° C. The solution is then evaporated in vacuo and the residue is crystallized from a mixture of 60 ml. acetic acid and 15 ml. acetic anhydride to give an M.P. of 192–193° C.

C. *1-acetyl-2-methyl-1,3,4,5-tetrahydro-5-oxobenz - [c, d]-indole-3-carboxylic acid.*—The anhydride of B, 0.01 mole is dissolved in 60 ml. of warm ethylene dichloride. The solution is cooled with agitation until the ambient temperature provides a fine suspension. To a suspension of 0.01 mole of the above anhydride in 60 ml. of ethylene dichloride at room temperature is added 0.05 mole of aluminum chloride. The mixture is heated on a steam bath for two hours, cooled by addition of ice, and a solution of 50 ml. 2 N hydrochloric acid is added. The precipitate is filtered, washed with water and redissolved in warm acetone. The solution is treated with decolorizing charcoal and cooled in a refrigerator to produce 1-acetyl-2-methyl-1,3,4,5-tetrahydro-5-oxobenz-[c,d] - indole-3-carboxylic acid as yellow needles; M.P. 215–217° C.

D. *2-methyl-1,3,4,5-tetrahydrobenz-[c,d]-indole-3 - carboxylic acid.*—A solution of 1 g. 1-acetyl oxo acid, obtained in C, 50 ml. of 0.2 N NaOH is allowed to stand at room temperature for three hours after acidification with diluted HCl, the precipitated product is filtered, washed with water and recrystallized from dilute acetic acid to give 2-methyl-1,3,4,5-tetrahydro-5-oxobenz-[c,d]-indole-3-carboxylic acid, M.P. 235–239° C. (dec.).

E. *2-methyl-1,3,4,5-tetrahydrobenz-[c,d]-indole-3 - carboxylic acid.*—The 1-acetyl-5-oxo acid 0.1 mole obtained in C and hydrazine hydrate (0.5 mole 85% solution) is added at room temperature to a cooled solution of sodium hydroxide (0.5 mole) in 250 ml. of diethylene glycol. The mixture is heated under reflux for 20 minutes, cooled, diluted with 500 ml. of water and then extracted with ether. The aqueous solution is cooled in an ice-bath, acidified with concentrated HCl, and extracted with ether. The ethereal extract is washed with water, dried over anhydrous sodium sulfate and evaporated in vacuo. The residue is dissolved in chloroform and treated with charcoal, filtered, concentrated and cooled. There is thus obtained 2-methyl-1,3,4,5-tetrahydrobenz-[c,d]-3 - indolecarboxylic acid as yellow plates, M.P. 173–174° C.

E–1. *2-methyl-1,3,4,5-tetrahydrobenz-[c,d] - indole - 3-carboxylic anhydride.*—Dicyclohexylcarbodimide (10 g., 0.049 mole) is added to a solution of 2-methyl-1,3,4,5-tetrahydrobenz-[c,d]-indole-3-carboxylic acid in 200 ml. of THF, and the solution is allowed to stand at room temperature for two hours. The precipitated urea is removed by filtration, and the filtrate is evaporated in vacuo to a residue and flushed with Skellysolve B. The residual oily anhydride is used without purification in the next step.

E–2. *t-Butyl 2-methyl-1,3,4,5-tetrahydrobenz-[c,d] - indole-3-carboxylate.*—t-Butyl alcohol (25 ml.) and fused zinc chloride (0.3 g.) are added to the anhydride from part E–1. The solution is refluxed for 16 hours and excess alcohol is removed in vacuo. The residue is dissolved in ether, washed several times with saturated bicarbonate, water, and saturated salt solution. After drying over magnesium sulfate, the solution is treated with charcoal, evaporated, and flushed several times with Skellysolve B for complete removal of alcohol. The residual oily ester is used without purification.

E–3. *t-Butyl 1-p-chlorobenzoyl-2-methyl-1,3,4,5-tetrahydrobenz-[c,d]-indole-3-carboxylate.*—A stirred solution of the ester from E–2 (0.08 mole) in dry DMF (450 ml.) is cooled to 4° in an ice bath, and sodium hydride (4.9 g., 0.098 mole, 50% susp.) is added in portions. After 15 minutes, p-chlorobenzoyl chloride (15 g., 0.085 mole) is added dropwise during 10 minutes, and the mixture is stirred for 9 hours without replenishing the ice bath. The mixture is then poured into 1 l. of 5% acetic acid, extracted with a mixture of ether and benzene, washed thoroughly with water, bicarbonate, saturated salt, dried over magnesium sulfate, treated with charcoal, and evaporated to a residue. The crude product is chromatographed on a column of 300 g. acid-washed alumina using ether-pet. ether (v./v. 20–100%) as solvent.

E–4. *1-p-chlorobenzoyl-2-methyl - 1,3,4,5 - tetrahydrobenz-[c,d]-indole-3-carboxylic acid.*—A mixture of 1 g. of the t-butyl ester from E–3 and 0.1 g. powdered porous plate is heated in an oil bath at 210° with magnetic stirring under a blanket of nitrogen for about 2 hours. No intensification of color (pale yellow) occurs during this period. After cooling under nitrogen, the product is dissolved in benzene and ether, filtered, and extracted with bicarbonate. The aqueous solution is filtered with suction to remove ether, neutralized with acetic acid, and then acidified weakly with dilute hydrochloric acid. The crude product is recrystallized from aqueous ethanol and dried in vacuo at 65°.

Example 2

The procedure of Example 1 is followed, using equal quantities of the following starting materials in place of 2-methyl-indole:

2-methyl-5-methoxy-indole;
2-methyl-5-methyl-indole;
2-methyl-5-benzyloxy-indole;
2-phenyl-5-methoxy-indole;
2-p-methoxyphenol-5-methoxy-9 indole;
2-methyl-5-fluoro-indole;
2-ethyl-5-methyl-indole;
2-β-chlorophenyl-5-chloro-indole;
5-methoxy-indole;
5-benzyloxy-indole;
5-methyl-indole;
5-ethoxy-indole;
2-benzyl-5-methoxy-indole, there are obtained the following corresponding final products:

1-p-chlorobenzoyl-2-methyl-6-methoxy-1,3,4,5-tetrahydrobenz-[c,d]-indole-3-carboxylic acid;
1-p-chlorobenzoyl-2-methyl-6-methyl-1,3,4,5-tetrahydrobenz-[c,d]-indole-3-carboxylic acid;
1-p-chlorobenozyl-2-methyl-6-benzyloxy-1,3,4,5-tetrahydrobenz-[c,d]-indole-3-carboxylic acid;
1-p-chlorobenzoyl-2-phenyl-6-methoxy-1,3,4,5-tetrahydrobenz-[c,d]-indole-3-carboxylic acid;
1-p-chlorobenzoyl-2-p-methoxyphenol-6-methoxy-1,3,4,5-tetrahydrobenz-[c,d]-indole-3-carboxylic acid;
1-p-chlorobenzoyl-2-methyl-6-fluoro-1,3,4,5-tetrahydrobenz-[c,d]-indole-3-carboxylic acid;
1-p-chlorobenzoyl-2-ethyl-6-methyl-1,3,4,5-tetrahydrobenz-[c,d]-indole-3-carboxylic acid;
1-p-chlorobenzoyl-2-chlorophenyl-6-chloro-1,3,4,5-tetrahydrobenz-[c,d]-indole-3-carboxylic acid;
1-p-chlorobenzoyl-6-methoxy-1,3,4,5-tetrahydrobenz-[c,d]-indole-3-carboxylic acid.

Example 3

The procedure of Examples 1 and 2 is followed using equivalent quantities of the following aroyl and heteroaroyl chlorides in place of 1-p-chlorobenzoyl chloride:

3,4,5-trimethoxybenzoyl chloride,
p-phenoxybenzoyl chloride,
p-trifluoroacetylbenzoyl chloride,
p-N,N-dimethylsulfamylbenzoyl chloride,
3-furoyl chloride,
1-methylimidazol-5-carboxylic acid chloride, 1,3-dimethyl-2,3-dihydro-2-oxoimidazole-4-carboxylic acid chloride,
1-methyl-benzimidazol-2-carboxy chloride,
5-fluoro-2-thenoyl chloride,
3-thenoyl chloride,
5-nitro-2-furoyl chloride,
1-methyl-indazole-3-carboxy chloride,
1-methyl-6-nitroindazole-3-carboxy chloride,
oxazole-4-carboxy chloride,
benzoxazole-2-carboxy chloride,
thiazole-4-carboxy chloride,
thiazole-2-carboxy chloride,
2-phenylthiazole-4-carboxy chloride,
2-benzylmercaptothiazole-4-carboxy chloride,
p-acetylbenzoyl chloride,
N,N-dimethyl-p-carboxamidobenzoyl chloride,
p-cyanobenzoyl chloride,
p-carbomethoxybenzoyl chloride,
p-formylbenzoyl chloride,
p-trifluoromethylthiobenzoyl chloride,
N,N-dimethyl-p-sulfonamidobenzoyl chloride,
p-methylsulfinylbenzoyl chloride,
p-methylsulfonylbenzoyl chloride,
p-benzyl-thiobenzoyl chloride,
p-mercaptobenzoyl chloride,
p-nitrobenzoyl chloride,
p-dimethylaminobenzoyl chloride,
p-acetaminobenzoyl chloride,
o-fluoro-p-chlorobenzoyl chloride,
o-methoxy-p-chlorobenzoyl chloride,
o-hydroxy-p-chlorobenzoyl chloride and
2,4,5-trichlorobenzoyl chloride to produce the corresponding N-1 aroyl and N-1 heteroaroyl derivatives of the 2 and 6 substituted 1,3,4,5-tetrahydrobenz-[c,d]-indole-3-carboxylic acids produced in Examples 1 and 2.

*Example 4.*—*1-isonicotinoyl-2-methyl-6-methoxy-1,3,4,5-tetrahydrobenz-[c,d]-indole-3-carboxylic acid*

A. *p-Nitrophenylisonicotinate.*—In a 500 ml. round bottom flask (all equipment flame dried) is added 13.9 g. of p-nitrophenol and 12.3 g. isonicotinic acid in 250 ml. dry tetrahydrofuran. Through a dropping funnel is added over 30 minutes 20.6 g. of dicyclohexylcarbodiimide in 100 ml. of dry tetrahydrofuran. The reaction is allowed to run overnight with stirring. The dicyclohexylurea which forms during the reaction is filtered. The filter cake is washed with dry tetrahydrofuran. The solution is evaporated to dryness. The solid is taken up in benzene and washed with sodium bicarbonate solution and then with water and dried over anhydrous sodium sulfate. The solution is concentrated under vacuum to dryness. The solid p-nitrophenylisonicotinate is then recrystallized from benzene, M.P. 126–127° C.

B. *t-Butyl-isonicotinoyl-2-methyl - 6 - methoxy-1,3,4,5-tetrahydrobenz-[c,d]-indole-3-carboxylate.*—In a 250 ml. round bottom flask (flame dried equipment) is placed at 0° C. with nitrogen, 100 ml. of dry dimethylformamide with 10.5 g. of t-butyl-2-methyl-6-methoxy-1,3,4,5-tetrahydrobenz-[c,d]-indole-3-carboxylate. To this is added 2.5 g. of 50% sodium hydride mineral oil mixture. After the mixture is stirred for 30 minutes there is added over 15 minutes a solution of 11 g. of p-nitrophenylisonicotinate in 50 ml. dry dimethylformamide. The reaction mixture is stirred for 4 hours at 0° C. under nitrogen followed by stirring under nitrogen at room temperature over night. The reaction mixture is then poured into an ice water-ether solution containing a few ml. of acetic acid and the layers are separated. The aqueous phase is washed with ether and the ether extracts are combined. To the ether layers is added a saturated solution of hydrogen chloride gas in dry ether. The ether is decanted off, leaving a heavy oil. The oil is washed with ether followed by an addition of aqueous sodium bicarbonate solution. The product is then extracted with ether. The ether layer is dried over anhydrous sodium sulfate and concentrated to dryness. The product is crystallized from dry ether.

C. To obtain the desired acid product, the t-butyl ester obtained in B is pyrolyzed according to Example 1 (E-4).

*Example 5*

A. The procedure of Example 4A is followed using an equivalent amount of the following acids in place of isonicotinic acid to produce the corresponding p-nitrophenyl esters:

1-methylpyrryl-2-carboxylic acid,
5-methyl-pyrazole-3-carboxylic acid,
1,2-benzoisothiazole-3-carboxylic acid,
1-phenylpyrazole-4-carboxylic acid,
1-phenyl-5-pyrazolone-3-carboxylic acid;
2-phenyl-5-methyloxozole-4-carboxylic acid,
isoxazole-3-carboxylic acid,
5-phenylisoxazole-3-carboxylic acid,
1,2-benzoisothiazole-3-carboxylic acid,
1,2,3-thiadiazole-4-carboxylic acid,
1-methyl-1,2,3-triazole-4-carboxylic acid,
nicotinic acid,
picolinic acid,
isonicotinic acid-N-oxide,
3-chloroisonicotinic acid,
6-methoxynicotinic acid,
6-phenylnicotinic acid,
α-pyrone-5-carboxylic acid,
pyridazine-4-carboxylic acid,
3-keto-4-methyl-2-phenyl-2,3-dihydropyridazine-6-carboxylic acid,
cinnoline-4-carboxylic acid,
2-methylmercapto-4-chloropyrimidine-5-carboxylic acid,
2,4-dichloropyrimidine-5-carboxylic acid,
pyrazinoic acid,
5-methoxy-pyrazinoic acid,
p-difluoromethoxy benzoic acid (prepared by the action of difluorochloromethane on the p-hydroxybenzoate of benzyl alcohol followed by hydrogenation of the benzyl group).

B. The p-nitrophenyl esters so obtained are then employed to aroylate or hetero-aroylate the product of Example 1 (E-2) and Example 2 in accordance with the procedure of Example 4B followed by pyrolysis in accordance with Example 1 (E-4).

*Example 6.*—*Methyl-1-p-chlorobenzoyl-2-methyl-1,3,4,5-tetrahydrobenz-[c,d,]-indole-3-carboxylate*

A. *Methyl - 2 - methyl-1,3,4,5-tetrahydrobenz - [c,d]-indole-3-carboxylate.*—To a solution of 0.1 mole of 2-methyl-1,3,4,5-tetrahydrobenz - [c,d]-indole-3-carboxylic acid and 0.2 mole of triethylamine in 200 ml. 1,2-dimethoxyethane is added 0.12 mole of isobutylchloroformate dropwise with stirring and ice-cooling. After ½ hour 0.1 mole of methanol in 30 ml. of dimethoxyethane is added and the reaction mixture is stirred for an additional 4–6 hours. The mixture is filtered, concentrated in vacuo and poured into iced water. The product is extracted into ether, washed with sodium bicarbonate and dried over Na$_2$SO$_4$. Evaporation of the ether solution and chromatography of the residue on 300 g. of acid-washed alumina using ether-petroleum ether (v./v. 20–50%) gives the methyl ester.

The same ester is obtained by the treatment of the starting acid with 1 equivalent of diazomethane in ether solution.

B. The procedure of Example 1 (E-3) is followed using equivalent quantities of the methyl ester obtained in A above in place of the t-butyl ester to provide the desired methyl-1-p-chlorobenzoyl derivative.

*Example 7*

A. The procedure of Example 6A is followed using equivalent quantities of the following alcohols in place of methyl alcohol: ethyl alcohol, phenol, cyclopropyl alcohol, β-dimethylamino ethanol, beta-diethylamino ethanol, phenethyl alcohol, allyl alcohol, iso-propyl alcohol, benzyl alcohol and N-beta-hydroxyethyl morpholine, cyclopropyl methanol, n-butyl alcohol and tetrahydrofurfuryl alcohol and the acids obtained in Examples 2 and 3 in place of 2-methyl-1,3,4,5-tetrahydrobenz-[c,d]-indole-3-carboxylic acid, to provide the corresponding esters of these acids.

B. The procedure of Example 1 (E–3) or Example 4B is followed using equivalent quantities of the esters obtained in A above in place of the t-butyl ester to provide the desired corresponding ester derivatives of the acids of Examples 2 and 3.

*Example 8*

The procedure of Example 6A is followed to convert the aroylated and hetero-aroylated acids obtained in Examples 1–4 to the corresponding amides by reaction with an equivalent quantity of the following primary and secondary amines and ammonia in place of the alcohols of Example 6A: allylamine, ethylamine, methylamine, dimethylamine, butylamine, diethylamine, phenethylamine, piperidine, N-ethylphenethylamine, pyrrolidine, benzylamine, morpholine, aniline, 1-methylpiperazine, p-chloroaniline, p-methoxyaniline, 1-β-hydroxyethyl piperazine, 1-methyl-2-aminomethyl pyrrolidine, 1-ethyl-2-aminomethyl piperidine, diethanolamine, tetrahydrofurfurylamine, 1 - phenylpiperazine, cyclohexylamine, 1,2,5,6-tetrahydropyridine, glycine, dimethylamine, β-diethylamino, and ammonia to produce the corresponding amides.

*Example 9*

The aroylated and hetero-aroylated acids obtained in Examples 1–4 are converted to the corresponding salts by reaction with a base as follows: A solution of 0.105 mole of the 1-p-chlorobenzoyl-1,3,4,5-tetrahydrobenz-[c,d]-indole-3-carboxylic acid in 100 ml. ethanol is mixed with 0.10 mole of Na ethoxide in 100 ml. ethanol with ice-cooling and stirring. The solution is concentrated in vacuo, diluted with 500 ml. ether, and the sodium salt precipitated is collected on a filter, washed with ether, and dried in vacuo to provide the Na salt.

Similarly when 0.10 mole of potassium t-butoxide, aluminum isopropoxide, triethylamine, β-diethylaminoethanol, choline and morpholine are used, the corresponding potassium, aluminum, triethylamine, β-diethylamino, ethyl, choline and morpholine salts are obtained.

Similarly when other aroylated and heteroaroylated acids produced in Examples 1–4 are utilized, the corresponding salts are obtained.

*Example 10*

A. *1 - p - chlorobenzoyl-2-methyl-1,3,4,5-tetrahydro-5-oxo-benz-[c,d]-indole-3-carboxylic acid 2-methyl-1,3,4,5 - tetrahydro - 5 - oxobenz-[c,d]-indole-3-carboxylic acid.*—A solution of 10 g. of 1-acetyl-2-methyl-1,3,4,5-tetrahydro - 5 - oxobenz-[c,d]-indole-3-carboxylic acid in 200 ml. 90% ethanol containing 0.1 mole of sodium hydroxide is stirred at room temperature for 4 hours. The mixture is concentrated in vacuo to 100 ml., poured into iced water and acidified with dilute HCl to give the product.

B. The procedure of Example 1 (E–4) is followed with p-chlorobenzoyl chloride to aroylate the t-butyl ester of A above to produce the desired 1-p-chlorobenzoyl derivative.

*Example 11*

Following the procedure of Example 10 and using equivalent quantities of the following 1-acetyl esters in place of 1 - acetyl-2-methyl-1,3,4,5-tetrahydro-5-oxobenz-[c,d]-indole-3-carboxylic acid; t-butyl-1-acetyl-2-methyl-6 - methoxy - 1,3,4,5-tetrahydrobenz-[c,d]-indole-3-carboxylate; and t-butyl-1-acetyl-2-methyl-6-benzyloxy-1,3,4,5-tetrahydrobenz-[c,d]-indole-3-carboxylate, there is obtained the corresponding aroylated and heteroaroylated compounds.

*Example 12.—1 - p - trifluoromethylbenzoyl-2-methyl-6-hydroxy - 1,3,4,5 - tetrahydrobenz-[c,d]-indole-3-carboxylic acid*

A mixture of 0.05 mole of 1-p-trifluoromethylbenzoyl-2 - methyl-6-benzyloxy-1,3,4,5-tetrahydrobenz-[c,d] - indole-3-carboxylic acid in 200 ml. of ethanol is hydrogenated over 10% palladium-carbon catalyst at 45 p.s.i. at room temperature until 0.05 mole of hydrogen are absorbed. The mixture then is filtered, evaporated in vacuo, chromatographed on a silica gel column (500 g.) using ether-petroleum (v./v. 50–100%) as eluent. The solvent is evaporated and the product recovered.

*Example 13.—1 - p - chlorobenzoyl-2-methyl-6-dimethylamino - 1,3,4,5 - tetrahydrobenz-[c,d]-indole-3-dimethylcarboxamide*

A. To a solution of N,N-dimethyl 1,3,4,5-tetrahydrobenz-[c,d]-indole-3-carboxamide in 5 ml. acetic acid is added dropwise a solution of 0.6 ml. nitric acid (d. 1.37) in 4 ml. acetic acid at room temperature with stirring. After 18 hours the reaction mixture is poured into iced water and extracted with ether. The ether solution is washed with water, sodium bicarbonate, dried over sodium sulfate and evaporated to a residue. The residue is chromatographed on a column of 30 g. acid-washed alumina using ether-petroleum ether (v./v. 30–100%) as solvent. The structure of the product N,N-dimethyl 6 - nitro - 1,3,4,5 - tetrahydrobenz-[c,d]-indole-3-carboxamide is established by N.M.R. Studies.

B. The procedure of Example I (E–4) is followed with p-chlorobenzoyl chloride to aroylate the 6-nitroindole amide of A.

C. 3 g. of the product of B is dissolved in 300 ml. dry methanol and reduced in hydrogen in an autoclave with Raney nickel as catalyst. After the theoretical amount of hydrogen is taken up, the catalyst is removed by filtration. The catalyst and reaction flask are washed with methanol. The methanol solution is evaporated to dryness. The product is crystallized from benzene.

*Example 14.—1 - p - chlorobenzoyl-2-methyl-6-methoxy-1,3,4,5 - tetrahydrobenz-[c,d]-indole-3-carboxylic acid anhydride*

A. Dicyclohexylcarbodiimide (0.049 mole) is dissolved in a solution of 2-methyl-6-methoxy-1,3,4,5-tetrahydrobenz-[c,d]-indole-3-carboxylic acid (0.10 mole) in 200 ml. of THF, and the solution is allowed to stand at room temperature for 2 hours. The precipitated urea is removed by filtration, and the filtrate is evaporated in vacuo to a residue and flushed with Skellysolve B. The residual oily anhydride is used without purification in the next step.

B. The procedure of Example I (E–4) is followed using the anhydride produced in A to provide the 1-p-chlorobenzoyl derivative.

I claim:

1. A compound of the formula:

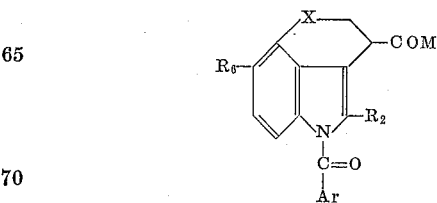

wherein:

Ar is selected from the group consisting of benzene and a substituted benzene wherein said substituent is selected from the group consisting of triloweralkoxy, phenoxy, trifluoroacetyl, N,N-di(lower alkyl)sulfamyl, lower alkanoyl, N,N-di(lower alkyl)p-carboxamido, cyano, carb-lower alkoxy, formyl, trihalolower alkyl-thio, N,N-di(lower alkyl)p-sulfonamido, lower alkyl sulfinyl, lower alkyl sulfonyl, mercapto, benzylthio, phenyl, lower alkyl, lower alkylthio, nitro, dilower-alkylamino, lower alkanoylamino, halogeno, lower alkoxy, hydroxy, 2,3,4-trihalo, benzyloxy, halobenzyl-oxy, amino, monoloweralkylamino, halolower alkoxy, halolower alkylthio, and trifluoromethyl;

$R_2$ is selected from the group consisting of hydrogen, lower alkyl, halophenyl, lower alkoxyphenyloxy, phenyl, benzyl, hydroxy, and benzyloxy;

$R_6$ is selected from the group consisting of hydrogen, lower alkyl, lower alkoxy, halogeno, hydroxy, di(lower alkyl)amino, and benzyloxy;

X is selected from the group consisting of methylene and carbonyl; and

M is selected from the group consisting of hydroxy, amino, lower alkoxy, phenoxy, cyclopropoxy, di(lower alkyl)amino-lower alkoxy, phenyl lower alkoxy, lower alkenyloxy, lower alkylamino, di(lower alkyl)amino, morpholino-lower alkoxy, tetrahydrofurylcarbonoxy, phenethylamino, N-ethylphenethylamino, benzylamino, anilino, p-chloranilino, p-methoxyanilino, diethanolamino, piperidino, pyrrolidino, morpholino, 1-methylpiperazino, N - phenylpiperazino, 1-β-hydroxyethylpiperazino, 1-methyl-2-aminomethyl pyrrolidino, 1-ethyl - 2 - aminomethyl piperidino, tetrahydrofurfurylamino, N-phenylpiperazino, 1,2,5,6-tetrahydropyridino, N-carbobenzyloxymethylamino, and N,N-dimethylcarboxamidomethyl; and OY wherein Y is selected from the group consisting of a pharmaceutically acceptable non-toxic cation and

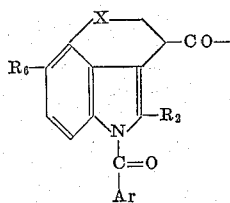

where X, $R_2$, $R_6$, and Ar are as defined above, X in the above structure and in the original formula above both being the same in any one compound.

2. 1 - p - methylthiobenzoyl-2-methyl-6-methoxy-1,3,4,5-tetrahydrobenz-[c,d]-indole-3-carboxylic acid.

3. 1 - p - methylthiobenzoyl-2-methyl-6-methoxy-1,3,4,5-tetrahydro-5-oxobenz-[c,d]-indole-3-carboxylic acid.

4. 1 - p - chlorobenzoyl - 2 - methyl-6-methoxy-1,3,4,5-tetrahydrobenz-[c,d]-indole-3-carboxylic acid.

5. 1 - p - chlorobenzoyl-2-methyl-6-methoxy-1,3,4,5-tetrahydro-5-oxobenz-[c,d]-indole-3-carboxylic acid.

6. A compound of claim 1 wherein:
Ar is lower alkylthiophenyl;
M is hydroxy;
$R_2$ is lower alkyl;
$R_6$ is lower alkoxy; and
X is methylene.

7. A compound of claim 1 wherein:
Ar is halophenyl;
M is hydroxy;
$R_2$ is lower alkyl;
$R_6$ is lower alkoxy; and
X is methylene.

8. A compound of claim 1 wherein:
Ar is lower alkylthiophenyl;
M is hydroxy;
$R_2$ is lower alkyl;
$R_6$ is lower alkoxy; and
X is carbonyl.

9. A compound of claim 1 wherein:
Ar is halophenyl;
M is hydroxy;
$R_2$ is lower alkyl;
$R_6$ is lower alkoxy; and
X is carbonyl.

References Cited by the Examiner

UNITED STATES PATENTS 3,029,236 4/62 Staeuble _____ 260—249.5

OTHER REFERENCES

Blount et al., Jour. Chem. Soc. (Proceedings), London, 1931, pages 3158–3160.

Finar, Organic Chemistry, vol. I, Longmans, Green and Co., New York, 1959, pages 191 and 616.

Hackh's Chemical Dictionary, 3rd Ed., The Blakiston Co., Philadelphia, 1950, page 18.

Progress in Drug Research, Edited by Jucker, vol. 6, pages 138–141, 1963.

Wertheim, Textbook of Organic Chemistry, 2nd Ed., The Blakiston Co., Philadelphia, 1948, pages 763–764.

NICHOLAS S. RIZZO, *Primary Examiner.*

JOHN D. RANDOLPH, *Examiner.*